United States Patent Office 3,578,720
Patented May 11, 1971

3,578,720
REDUCTION OF AROMATIC NITROCOMPOUNDS
David Dodman and John Mathers, Woolley, Manchester,
England, assignors to Imperial Chemical Industries
Limited, London, England
No Drawing. Filed Nov. 14, 1968, Ser. No. 775,895
Claims priority, application Great Britain, Nov. 24, 1967,
53,636/67; Mar. 29, 1968, 15,392/68
Int. Cl. C07c 81/02, 107/06
U.S. Cl. 260—647                                    14 Claims

ABSTRACT OF THE DISCLOSURE

Reducing aromatic nitrocompounds to nitroso-, azoxy- or azo-compounds with carbon monoxide in presence of a catalyst comprising oxygenated compounds of at least two heavy metals.

---

This invention relates to a process for reducing aromatic nitro compounds with the production of nitrogenous bodies, other than primary amines, and to catalysts for use in such a process.

It is known that aromatic nitrocompounds can be partially reduced to valuable products, e.g. azo and azoxy compounds, by treatment with gaseous reducing agents in presence of a catalyst. It is, however, difficult to prevent over-reduction, with the formation of primary amines when known types of catalyst are employed. Known reduction catalysts include finely divided metals, e.g. Raney nickel or finely divided platinum. Certain easily reducible oxides for example platinum dioxide (Adam's catalyst) have been used in reduction processes, but heavy metal oxides in general are not very effective catalysts unless they are reduced to metal by treatment with hydrogen either by operating the whole process at high temperature and/or high pressures or by carrying out a prereduction of the catalyst at high temperatures before reducing the nitrocompound.

It has now been found that certain compositions comprising oxygnated compounds of at least two heavy metals are effective in catalysing the reduction of nitro compounds by means of carbon monooxide, even at relatively low temperatures and pressures, to produce nitroso, azoxy and azo compounds.

The production of nitrosocompounds in this simple manner is remarkable, for although nitrosocompounds are potentially valuable intermediates for use in the chemical industry because of their reactivity with amines and other compounds, their manufacture has hitherto proved to be difficult or uneconomic.

The term "heavy metal" is used herein to denote one of the following elements:

Titanium, vanadium, chromium, manganese, iron, cobalt, nickel, copper, germanium, zirconium, molybdenum, silver, tin, antimony, lanthanum, cerium, neodymium, tantalum, tungsten, rhenium, gold, mercury, thallium, lead, bismuth and thorium.

The catalysts used in the invention comprise oxides, hydroxides, carbonates (including basic carbonates), or basic phosphates of at least two heavy metals as hereinbefore defined and are prepared by procedures which include as an essential step either a coprecipitation from solution or a heating together of the said heavy metals as their hydroxides or heat unstable salts or mixtures thereof.

Catalysts may, for example, be prepared by precipitating an aqueous solution of mixed heavy metal salts as the oxides, hydroxides or carbonates, or basic phosphates or as a mixture of these, and washing and drying the precipitate.

Alternatively a catalyst may, for example, be prepared by heating an intimate mixture of the hydroxides or the nitrates, oxalates, formates, acetates, carbonates or other heat-unstable salts at their decomposition temperatures.

If desired the heating to decomposition temperature or the precipitation may be carried out in situ so that the resultant composition is immediately available to catalyse the reduction of a nitrocompound.

It is preferred to use in the process of the invention a catalyst comprising two or more of the following metals as their oxides, hydroxides, carbonates, or basic phosphates or mixtures thereof:

Manganese, iron, cobalt, nickel, copper, silver, cerium, lead.

These metals provide the most effective catalysts.

Combinations of heavy metals found to be especially effective are:

Lead and manganese for the production of nitroso compounds.

Cobalt and manganese for the production of nitroso compounds or of azoxy compounds.

Copper and cerium for the production of azo compounds.

It is sometimes advantageous to partially reduce the heavy metal oxides, hydroxides, carbonates, or basic phosphates by pre-treatment with carbon monoxide before use as a catalyst. By partial reduction we mean reduction which does not produce elementary metal in substantial amount.

If desired supoprts e.g. pumice, asbestos, fireclay or kieselguhr can be incorporated with the heavy metal oxides, hydroxides or carbonates to provide a supported catalyst.

Although in general it appears that compositions comprising two of the heavy metals in relative proportions by weight of from 1:20 to 1:1 are especially effective reduction catalysts the optimum proportions for the production of the best effect depends upon the particular heavy metals present. In some cases compositions in which the proportion of one heavy metal relative to the others is as low as 1% are effective catalysts.

The catalysts used in the invention are easy to make, are nonpyrophoric at ambient temperatures and many of them are cheap. They are long lived and not easily poisoned, for example by sulphur compounds.

It is believed that the catalysts used in the invention have a fundamental lattice composed of atoms of one heavy metal and oxygen atoms or hydroxide, carbonate or phosphate groups and that atoms of other heavy metals act as impurity atoms in the lattice thereby making chemical imperfections in the lattice which are responsible for the catalytic properties.

According to the invention a process for the manufacture of an aromatic nitroso-, azoxy- or azo-compound comprises contacting an aromatic nitrocompound with carbon monoxide in the presence of a catalyst comprising two or more heavy metals as hereinbefore defined as their oxides, hydroxides, carbonates, or basic phosphates, or as partial reduction products thereof, said catalyst having been prepared by a procedure including as a step either a coprecipitation or a heating together of the heavy metals as their hydroxides or heat unstable salts, and the contact being maintained for a time insufficient to produce substantial proportions of over-reduction products.

The temperature at which the process is carried out depends upon the nitrocompound and the catalyst employed. Generally the temperature is in excess of 100° C. and with the preferred catalysts the most advantageous temperatures are from 100° C. to 400° C., especially 105° C. to 320° C.

The process may in general be carried out at atmospheric pressure, but higher pressures (e.g. up to 40 p.s.i.g.) are sometimes advantageous.

The carbon monoxide used in the process of the invention need not be pure. It may, for example, be in admixture with a carrier gas which is inert under the conditions used, for example nitrogen or carbon dioxide. It is, however, essential that the carbon monoxide should not be in the admixture with hydrogen, otherwise over-reduction takes place and the yield of nitroso-, azoxy- or azo-compound is diminished.

Diluents which are normally liquid may also be present in the process of the invention, provided that said diluents are such as to remain inert under the conditions employed. It is essential that water and hydroxylic solvents should not be present since these provide a source of hydrogen and thereby promote reduction to primary amines. Oxygenated solvents in general, e.g. ethers and ketones, have undesirable effects upon the process and should be avoided.

In one embodiment of the invention the process may be carried out in a continuous manner by passing the nitro compound either in a liquid phase (i.e. in the liquified state or in solution in an inert solvent) or in the vapour phase, together with gaseous carbon monoxide through or over a bed of catalyst in a reduction zone. Fixed bed or fluid bed techniques may be adopted and the flow of carbon monoxide and nitrocompound may be in the same or in opposite directions as desired. The flow rate of carbon monoxide and nitrocompound can be adjusted to provide appropriate contact times for the production of the desired product.

For the production of nitrosocompounds short contact times (of the order of one minute or less) are desirable in order to minimise over-reduction and high flow rates should therefore be used. When all the reactants are in the vapour phase, fluid bed techniques are advantageous for the production of nitrosocompounds since by this means short contact times may easily be arranged. When the preferred catalysts are used in a fluid bed process contact times of 5 to 60 seconds, especially 15 to 35 seconds have been found satisfactory. Nitrosocompounds forming the product of the process pass forward from the catalyst bed and may be collected and purified if desired in known manner, for example by distillation.

If a nitrosocompound produced by the process is more readily volatilised than the nitrocompound it is possible to operate under conditions whereby the carbon monoxide gas stream quickly sweeps out vapourised nitrosocompound from the catalyst and nitrocompound. For example the nitrocompound together with suspended catalyst may be heated at a temperature below or up to its boiling point and a rapid stream of gaseous carbon monoxide passed through the hot suspension. The nitrosocompound may be recovered in a pure state by cooling the effluent gases.

For the production of azoxycompounds, contact times should be longer than those used for the nitrosocompounds. Conveniently carbon monoxide and the nitrocompound in vapour form may be passed through a fixed bed of supported catalyst, for example a mixture of cobalt and manganese oxides or hydroxides on pumice, heated externally. Removal of azoxycompound from the catalyst bed may be assisted by the presence of an inert diluent.

Azocompounds can be produced in similar manner to azoxycompounds. A catalyst which is especially suitable for use in the production of azocompounds comprises silver and manganese hydroxides or oxides on pumice.

Effluent gases produced in the process of the invention may contain residual carbon monoxide which, after removal of carbon dioxide byproduct by scrubbing, may be recirculated through the reduction zone. Alternatively the effluent gases may be contacted with carbon (e.g. coke) at high temperature to reduce the carbon dioxide to carbon monoxide which is recirculated through the reduction zone.

The invention is illustrated but not limited by the following examples in which the parts are by weight unless otherwise stated and the relationship of parts by weight to parts by volume is that of the kilogram to the litre.

EXAMPLE 1

Reduction of nitrobenzene to azobenzene.

A catalyst comprising oxides of manganese and silver is prepared as follows:

1.3 parts of manganese acetate hydrate (MW 245) are dissolved in 5 parts of water, 1 part of nitric acid is added followed by a solution of 0.8 part of silver nitrate in 2.5 parts of water. The solution is absorbed on a support made by crushing unglazed earthenware, sifting and using that portion passed by an 8 mesh sieve but retained by a 20 mesh sieve. The water is removed by evaporation at 100° C. and the residue heated at 600° C. until the evolution of nitrous fumes ceases.

The catalyst so prepared is packed into a reaction column 0.8 cm. in diameter, surrounded by a heating element, which has at the top inlet feeds for nitrobenzene and carbon monoxide. The heating element is set to give a temperature of 150° C. and carbon monoxide and nitrobenzene fed in simultaneously in the proportions 6,000 parts by volume of carbon monoxide and 2 parts by weight of nitrobenzene per hour. From the base of the reaction column is recovered a condensate consisting of a mixture of azobenzene and unchanged nitrobenzene in the proportion 3 to 7 which may be separated by fractional distillation. The carbon monoxide effluent, after removing water and carbon dioxide for example by passing over solid sodium hydroxide, and the recovered nitrobenzene may be re-cycled through the catalyst column if so desired.

Neither silver oxide nor manganese oxide is effective as a catalyst if used alone.

EXAMPLE 2

Reduction of nitrobenzene to azoxybenzene.

A catalyst comprising oxides of manganese and cobalt is prepared as follows:

1.3 parts of manganese acetate hydrate MW 245, are dissolved in 7.5 parts of water to which 1 part of nitric acid is added. 1.3 parts of cobalt nitrate hydrate MW 291 are next dissolved in and the solution absorbed onto 6.5 parts of pumice granules size 20–60 mesh. The water is evaporated at 100° C. and the residue heated at 600° C. until the evolution of nitrous fumes ceases.

The catalyst is packed into a reaction column and the procedure of Example 1 is followed with similar feeds of nitrobenzene and carbon monoxide. A condensate is obtained consisting of a mixture of azoxybenzene and nitrobenzene in the proportions 3 to 7 which may be separated by distillation.

Neither manganese oxide nor cobalt oxide is effective if used alone.

EXAMPLE 3

Reduction of nitrobenzene to a mixture of azo- and azoxybenzene.

A catalyst comprising oxides of cerium and iron is prepared as follows:

2 parts of cerous nitrate are dissolved in 4 parts of water. 0.2 parts of ferric nitrate are dissolved in 4 parts of water and the solutions are mixed. The solution is absorbed onto 6.5 parts of pumice granules (20–60 mesh) and dried out at 400° C. until evolution of nitrous fumes ceases.

The catalyst is used as in the manner of Example 1. A condensate comprising a mixture of azobenzene, azoxybenzene and nitrobenzene is obtained with approximately 20% conversion of the nitrobenzene feed.

Neither cerium oxide nor iron oxide is effective when used alone.

above for the carbonates and slightly lower yields for the basic phosphates.

EXAMPLE 10

A catalyst is prepared as follows. 79.2 parts of manganese chloride ($MnCl_2 \cdot 4H_2O$) and 23.8 parts of cobaltous chloride ($CoCl_2 \cdot 6H_2O$) are together dissolved in 1500 parts of water and when dissolved 25 parts of an absorbent carbon (Actibone S) is added. To the stirred solution is added approximately 40 parts of sodium hydroxide dissolved in 500 parts of water until a test sample persistently shows a red colouration on Brilliant Yellow test paper (i.e. pH 10.0). The suspension is diluted to 5000 parts with water and the precipitate allowed to settle. The supernatant liquor is decanted, water is again added to 5000 parts volume, stirred and again allowed to settle. Washing of the precipitate is thus continued by decantation until the supernatant layer no longer shows an alkaline reaction on spotting onto Brilliant Yellow test paper. The precipitate is then filtered, washed with deionised water and dried to constant weight at 100° C. After grinding to a fine powder, 65 parts of catalyst are obtained.

A glass reaction vessel is set up with an agitator passing through a gas tight gland, a thermometer and an inlet lead for carbon monoxide gas delivering beneath the agitator. An outlet from the vessel passes via a short vertical air condenser to a U-tube cooled in a methanol/solid carbon dioxide bath. The vessel is heated in an electric heating mantle. To the vessel is charged 100 parts of nitrobenzene and 10 parts of the catalyst and after heating to reflux temperature (211° C.) carbon monoxide is admitted with agitation at a rate of 500 parts by volume per minute. After an initial period of 1 hour during which all moisture is removed from the reaction vessel, nitrosobenzene collects in the cooled U-tube as a white or pale green crystalline mass at the rate of 2 parts per hour. This represents a conversion rate of 2.34% of nitrobenzene per hour.

The above oxide catalyst contains the metals in the proportions of 1 atom of cobalt to 4 atoms of manganese. By replacing this catalyst by one prepared in the same way but containing the metals in the proportions of 1 atom of cobalt to 9 atoms of manganese a conversion rate of 1.11% of nitrobenzene per hour is obtained. No significant amount of nitrosocompound is produced by the use, under similar conditions, of an oxide containing manganese only prepared by pyrolysis of manganese carbonate.

EXAMPLE 11

A catalyst composition is prepared in exactly the same way as in Example 10 but using 16.2 parts of ferric chloride ($FeCl_3$) in place of the cobalt chloride to give an oxide mixture containing metals in the proportions 1 atom of iron to 4 atoms of manganese. Use of the catalyst instead of the catalyst of Example 10 gives a conversion of 1.17% of nitrobenezne per hour. A catalyst containing the metals in the proportion of 1 atom of iron to 9 atoms of manganese gives similar results.

EXAMPLE 12

A catalyst composition is prepared in exactly the same way as in Example 10 but in place of the manganese and cobalt salts 43.4 parts of cerium nitrate ($Ce(NO_3)_3 6H_2O$) and 64.8 parts of ferric chloride ($FeCl_3$) are used, thus producing an oxide mixture containing metals in the proportion of 1 atom of cerium to 4 atoms of iron. Use of this catalyst in the process of Example 10 gives a conversion of 1.82% per hour.

A catalyst made in the same way but replacing the metal salts by 108.5 parts cerium nitrate and 49.5 parts of manganese chloride to give an oxide catalyst containing metals in the proportion of 1 atom of cerium to 1 atom of manganese gives a conversion rate of 1.44% per hour.

EXAMPLE 13

A series of catalysts comprising mixtures of lead and manganese oxides containing 0.5 g. atom of the combined metals on 25 g. of carbon support is prepared following the procedure described in Example 10. For the preparation of each catalyst the source of the manganese was a manganese nitrate solution containing 1.0 g. atom of manganese in 488 ml. and the lead source was lead nitrate containing 1.0 g. atom of lead in 331.2 g.

Each catalyst was then used for converting nitrobenzene to nitrosobenzene as described in Example 10 using 1 part of catalyst to each 10 parts of nitrobenzene. The results are summarised in the following table:

TABLE I

| Catalyst preparation | | | |
|---|---|---|---|
| Manganese nitrate solution, mls. | Lead nitrate, g. | Atom proportions, Mn:Pb | Conversion rate, percent per hour |
| 244 | 0 | 100:0 | 0.51 |
| 232 | 8.28 | 95:5 | 1.42 |
| 220 | 16.66 | 90:10 | 1.37 |
| 195 | 33.1 | 80:20 | 2.62 |
| 171 | 49.7 | 70:30 | 4.53 |
| 122 | 82.8 | 50:50 | 3.16 |
| 0 | (¹) | 0:100 | Nil |

¹ Red lead oxide.

The results given in Table I show that the best results were obtained with an oxide containing 70 atom proportions of manganese to 30 atom proportions of lead.

EXAMPLE 14

A catalyst is prepared as follows:

16.25 parts of manganese acetate ($MnAc_2 4H_2O$) are dissolved in 200 parts of water and 8.5 parts of 70% nitric acid and 10.675 parts of silver nitrate are dissolved in 100 parts of water. The two solutions are then mixed with stirring. 50% solution of caustic soda in water is then added dropwise until a sample of the suspension shows a positive reaction when spotted on to Brilliant Yellow paper. Stirring is stopped and the suspension is washed with water, by decantation, until it is alkali free when spotted on to Brilliant Yellow paper.

80 parts of pumice, ground until it passes through a sieve of 100 mesh (B.S.) but not one of 150 mesh (B.S.) are then added to the washed suspension and the mixture is filtered. The filter cake is then washed with acetone and dried.

15 parts of this catalyst are placed in a fluid bed reactor and prereduced at 220° C. with carbon monoxide until no more carbon dioxide is liberated. During 1 hour 5 parts of nitrobenzene are then fed into the reactor in portions together with a total of 17.5 parts of carbon monoxide. The temperature of the bed is maintained at 210° C. throughout the additions. 0.5 parts of nitrosobenzene are recovered from the effluent gases. This represents a conversion of 12.5% of nitrobenzene.

EXAMPLE 15

In place of the nitrobenzene used in Example 10 the following compounds are used: o-chloronitrobenzene, m-chloronitrobenzene, p-chloronitrobenzene, p-nitrotoluene or p-nitroanisole.

Conversion rates to the corresponding nitrosocompounds are given in the following table:

Compound: Conversion rate percent per hour
   o-Chloronitrobenzene _____ 0.9
   m-Chloronitrobenzene _____ 1.49
   p-Chloronitrobenzene _____ 1.26
   p-Nitrotoluene _____ 1.8
   p-Nitroanisole _____ 1.03

EXAMPLE 16

In place of the 100 parts of nitrobenzene used in Example 10 is used a mixture of 50 parts of nitrobenzene and 50 parts of trichlorobenzene.

EXAMPLE 4

This example illustrates the technique used for catalyst testing and describes a method for determining the optimum proportions of particular heavy metal oxides.

A range of compositions comprising oxides of copper and cerium is prepared as follows:

1.55 parts of cerous nitrate ($Ce(NO_3)_3 6H_2O$.MW 434.25) and 0.19 part of copper nitrate ($Cu(NO_3)_2 3H_2O$.MW 241.6) are dissolved in 150 parts of de-ionised water and 5% caustic soda solution added until the solution reacts strongly alkaline. The precipitate of copper and cerium hydroxide is allowed to settle, the supernatant liquor decanted and the residue washed repeatedly by decantation until the supernatant liquor no longer shows an alkaline reaction. 10 parts of pumice granules (size 22–60 mesh) are stirred in and the suspension then filtered under vacuum. The residue is washed on the filter, firstly with methyl alcohol and then with acetone and dried by heating at 100° C. to constant weight. The composition so obtained contains a proportion of 10 atoms of cerium to one of copper.

In a similar manner compositions are prepared in which the relative atomic proportions of cerium and copper are 20:1, 40:1 and 80:1. Each composition in turn is packed into a tube 0.8 cm. diameter to give a packed length of 20.0 cms. 10 to 12 g. of catalyst is required. The tube is surrounded by a heating element set to give a temperature of 150° C. in the catalyst packing. Carbon monoxide is passed through at this temperature at the rate of 50 ml./minute until no more carbon dioxide can be detected in the exhaust gases. Nitrobenzene feed is then started and 1.0 g. is added during 1 hour while the carbon monoxide stream is continued. Nitrobenzene feed is stopped but the carbon monoxide flow is continued for a further 1 hr. period. During the experiment the exit gases are passed through a condensing coil immersed in a cooling bath of solid carbon dioxide and methanol. The condensate is collected from this. The catalyst is discharged from the reaction tube and washed on a filter with acetone, the apparatus washed with acetone, and the combined acetone washings and condensate are distilled to remove the acetone. The residue is dissolved in chloroform and analysed for azo- and azoxybenzene content by gas-liquid chromatography. Typical results are given in the following table.

| Catalyst composition, atom proportions | | Yield, percent g. based on nitrobenzene charged | |
|---|---|---|---|
| Cerium | Copper | Azobenzene | Azoxybenzene |
| 10 | 1 | 55.0 | 6.5 |
| 20 | 1 | 67.0 | 7.0 |
| 40 | 1 | 72.0 | 14.0 |
| 80 | 1 | 39.5 | 13.5 |
| Cerium only | | (¹) | (¹) |

¹ Traces only.

The above results indicate that there is an optimum ratio of cerium to copper which is around 40 atoms of cerium to 1 atom of copper.

Compositions having a third ingredient, e.g. oxides of heavy metals comprising 70% iron, 20% cerium and, as a third ingredient 10% of copper, cobalt, lanthanum or neodymium were made in similar manner and found to be effective in producing yields of 50–60% but show no advantages over the binary mixtures.

EXAMPLE 5

Catalysts are prepared as in Example 4 but using in place of the copper nitrate salts of the following metals in amounts to give a ratio of 1 atom of metal to 20 atoms of cerium. This may not be the optimum proportion but the overall conversion of nitrobenzene to azo and azoxybenzene does give a measure of the efficiency of the metal added to the cerium as a co-catalyst. The results can be conveniently classified into 3 groups as follows:

(1) Good activity with conversions over 20%. This group includes iron, manganese and gold.

(2) Medium activity with conversion 10–20%. This group includes cobalt, vanadium, nickel and rhenium.

(3) Low activity with conversion 5–10%. This group includes thorium, tantalum, antimony, chromium, bismuth, mercury, molybdenum, lead, tungsten, titanium, germanium, zirconium, tin and thallium.

EXAMPLE 6

Composition based on other oxygen containing compounds of heavy metals can be used for example carbonates, as follows:

Ferric chloride ($FeCl_3$, 3.0 parts) is dissolved in 75 parts of water. Copper chloride ($CuCl_2 \cdot 2H_2O$, 0.316 part) is dissolved in 75 parts of water and the two solutions are mixed. 5% sodium carbonate solution is added until the solution reacts strongly alkaline. The precipitate is washed by decantation with de-ionised water until free from alkali. 6.5 parts of pumice are added and after filtering, the residue is washed with methanol, then acetone and dried at 100° C. Using 10 g. of this composition the procedure of Example 4 is followed. A 56% conversion of nitrobenzene to azo- and azoxybenzene is obtained, together with smaller amounts of other products, for example diphenyl urea.

EXAMPLE 7

A column of internal diameter 15 mm. and total length 300 mm. is packed with a composition prepared as in Example 6 and pretreated with carbon monoxide.

A solution of nitrobenzene in an equal volume of orthodichlorobenzene is added at a rate of 10 ml. per hour down the column and a stream of carbon monoxide passed down the column. The column is heated externally so that the temperature inside the column is 160° C. The product was collected at the bottom of the column in a receiver. Analysis of the product revealed the presence of azobenzene.

EXAMPLE 8

In place of the nitrobenzene in Examples 1 to 7, p-nitrotoluene, o-nitrotoluene, p-chloronitrobenzene, m-nitrotoluene, p-nitroethylbenzene, p-nitrobutylbenzene, m-nitrobenzonitrile, m-nitroanisole, p-nitroanisole, 4-nitrodiphenyl, 4-nitrodiphenylether, m-nitroacetophenone, p-bromonitrobenzene or 3,4-dichloronitrobenzene may be used. Analysis of the products of the techniques of thin-layer or gas-liquid chromatography indicates the presence of the azo and azoxy derivatives corresponding in each case to those which are obtained from nitrobenzene.

EXAMPLE 9

15.1 parts of manganese acetate, ($Mn(C_2H_3O_3)_2 4H_2O$), 8.72 parts of nickel nitrate ($Ni(NO_3)_2 6H_2O$) and 10.5 parts of cobalt chloride ($CoCl_3$) are dissolved in 1200 parts of water and 70° Tw. sodium hydroxide solution added slowly with stirring until the solution shows a strong alkaline reaction on Brilliant Yellow paper. The precipitate is allowed to settle and then is washed with water by decantation until the supernatant liquors no longer show an alkaline reaction on Brilliant Yellow paper. 150 parts of pumice (size 22–60 mesh) are added with stirring and the suspension filtered. The solid residue is dried at 100° C. to give approximately 170 parts of catalyst composition.

10 grams of the above composition are used as in Example 4. Nitrobenzene is converted to a mixture of azo- and azoxybenzene at a rate of approximately 50% per pass.

In place of the sodium hydroxide used above for precipitation of the metals sodium carbonate solution or sodium phosphate solution may be used instead to give a precipitate of basic carbonates or basic phosphates of the metals. A catalyst so prepared gives similar results to the A conversion rate of 2.12% per hour of the nitrobenzene to nitrosobenzene is obtained indicating that the presence of the inert solvent trichlorobenzene does not interefere with the reaction.

EXAMPLE 17

A catalyst is prepared as follows:

1.425 parts of cupric nitrate and 23.25 parts of cerous nitrate are dissolved in 600 parts of water and 85 parts of pumice comprising 15 parts of 60–100 mesh pumice (i.e. pumice passing a 60 mesh sieve (B.S.) but not a 100 mesh sieve), 55 parts of 100–150 mesh pumice and 15 parts of 150–200 mesh pumice. The suspension is then made alkaline to Brilliant Yellow paper by the addition of sodium hydroxide liquor. After removal by filtration, the catalyst is washed with water until the washings are alkali-free. The filter cake (which still shows an alkaline reaction) is suspended in water and oxalic acid is added until the solid is alkali free. The catalyst is then filtered off, washed with water and acetone and dried at 100° C. for 18 hours.

25 parts of this catalyst are heated at 400° C. for 20 hours, charged to a fluid bed reactor and treated with carbon monoxide at 250° C. During one hour, 3 parts of nitrobenzene and 4000 parts by volume of carbon monoxide are added evenly to the reactor kept at 210–220° C. Nitrosobenzene is recovered from the effluent gases by condensation and azobenzene is recovered by extracting the catalyst bed. Conversion of nitrobenzene to nitrosobenzene and azobenzene was about 20%.

EXAMPLE 18

An iron-manganese catalyst composition is prepared in the manner of Example 11. 5 parts of this catalyst are triturated with 10 parts of water and the resulting slurry thoroughly mixed with 10 parts of pumice granules (size 20–60 mesh). The product is dried at 100° C. to give 15 parts of catalyst.

12 grams of this material is packed into a U-shaped tube 0.8 cm. in diameter to give equal heights in both legs of the tube. A pad of glass wool is pressed on to the top of the catalyst in the right hand leg and on this is packed dry pumice granules, size 20–60 mesh to give a packed height of 7.5 cms. which functions as a product absorber. The U-tube is immersed in a heating bath up to the level of the catalyst, and the bath temperature raised to 150° C. Carbon monoxide is passed into the left-hand leg at a rate of 50 ml./minute, until the exit gases no longer contain carbon dioxide. Nitrobenzene (1.0 g.) is now added evenly together with the carbon monoxide to the left-hand leg during a period of 1 hour, after which carbon monoxide flow is continued for a further period of one hour. During the experiment the exit gases are passed through a condensing coil immersed in a cooling bath of solid carbon dioxide and methanol.

At the end of the experiment examination of the product absorbed on the pumice in the U-tube shows a bottom separated layer of 1.0 cm. in thickness containing essentially pure azobenzene, above this is a yellow layer containing azoxybenzene which merges which merges into a top layer of unchanged nitrobenzene. In the condensing coil white crystals of essentially pure nitrosobenzene are obtained. The overall conversion of nitrobenzene to azo-, azoxy- and nitrosobenzene is approximately 25%.

EXAMPLE 19

In place of the nitrobenzene in Examples 10–13, p-fluoronitrobenzene, p-bromonitrobenzene, m-nitrotoluene or m-nitroanisole are used. Analysis of the products by gas-liquid chromatography indicates the presence of the corresponding nitrosocompound.

We claim:
1. A process for the reduction of an aromatic nitrocompound to a nitroso-, azoxy- or azo- compound which process comprises preparing a catalyst comprising two or more heavy metals selected from the group consisting of titanium, vanadium, chromium, manganese, iron, cobalt, nickel, copper, germanium, zirconium, molybdenum, silver, tin, antimony, lanthanum, cerium, neodymium, tantalum, tungsten, rhenium, gold, mercury, thallium, lead, bismuth and thorium, as their oxides, hydroxides, carbonates or basic phosphates or partial reduction products thereof, the preparation including as an essential step either a coprecipitation from solution or a heating together of the said heavy metals as their hydroxides or heat-unstable salts or mixtures thereof, and contacting said catalyst with an aromatic nitrocompound and carbon monoxide at a temperature in the range 100° to 400° C.

2. Process according to claim 1 wherein the catalyst comprises a pair of heavy metals selected from the group of pairs consisting of:
 (a) lead and manganese
 (b) cobalt and manganese
 (c) copper and cerium
as their oxides, hydroxides, carbonates or basic phosphates or a partial reduction product thereof.

3. Process according to claim 1 wherein two heavy metals are used in relative proportions by weight of 1:20 to 1:1.

4. Process according to claim 2 wherein the heavy metals are used in relative proportions by weight of 1:20 to 1:1.

5. Process according to claim 1 carried out in the presence of an inert non-hydroxylic normally liquid diluent.

6. Process according to claim 1 operated continuously by passing the nitrocompound and carbon monoxide through a reduction zone containing a bed of catalyst.

7. Process according to claim 6 wherein a nitrosocompound is manufactured by passing nitrocompound vapour and carbon monoxide through a fluidised bed of catalyst using a short contact time.

8. Process according to claim 7 wherein the catalyst comprises two or more heavy metals selected from the class consisting of manganese, iron, cobalt, nickel, copper, silver, cerium and lead in the said form and the contact time is 5 to 60 seconds.

9. Process according to claim 8 wherein the contact time is 15 to 35 seconds.

10. Process according to claim 7 wherein the catalyst consists essentially of lead and manganese in the said form and the contact time is 5 to 60 seconds.

11. Process according to claim 10 wherein the contact time is 15 to 35 seconds.

12. Process according to claim 7 wherein the catalyst consists essentially of cobalt and manganese in the said form and the contact time is 5 to 60 seconds.

13. Process according to claim 12 wherein the contact time is 15 to 35 seconds.

14. Process according to claim 1 wherein a nitrosocompound of greater volatility than its corresponding nitrocompound is manufactured by passing carbon monoxide rapidly through a suspension of catalyst in the said nitrocompound, whereby to sweep out the vaporised nitrocompound.

References Cited

UNITED STATES PATENTS

| | | | |
|---|---|---|---|
| 2,419,976 | 5/1947 | Trepagnier et al. | 260—647 |
| 2,684,358 | 7/1954 | Sogn | 260—647X |
| 2,684,359 | 7/1954 | Sogn | 260—647X |

LELAND A. SEBASTIAN, Primary Examiner

U.S. Cl. X.R.

260—143, 205